Jan. 17, 1950

J. SULLIVAN

STERILIZING HOUSING FOR TELEPHONES
WITH AN ULTRA-VIOLET LAMP

Filed Jan. 29, 1949

2,495,034

INVENTOR.

John Sullivan

BY

Fritz Ziegler

Attorney

Patented Jan. 17, 1950 2,495,034

UNITED STATES PATENT OFFICE 2,495,034

STERILIZING HOUSING FOR TELEPHONES WITH AN ULTRAVIOLET LAMP

John Sullivan, Flushing, N. Y.

Application January 29, 1949, Serial No. 73,555

2 Claims. (Cl. 179—185)

Figures 1, 2, 3, 4, 5:
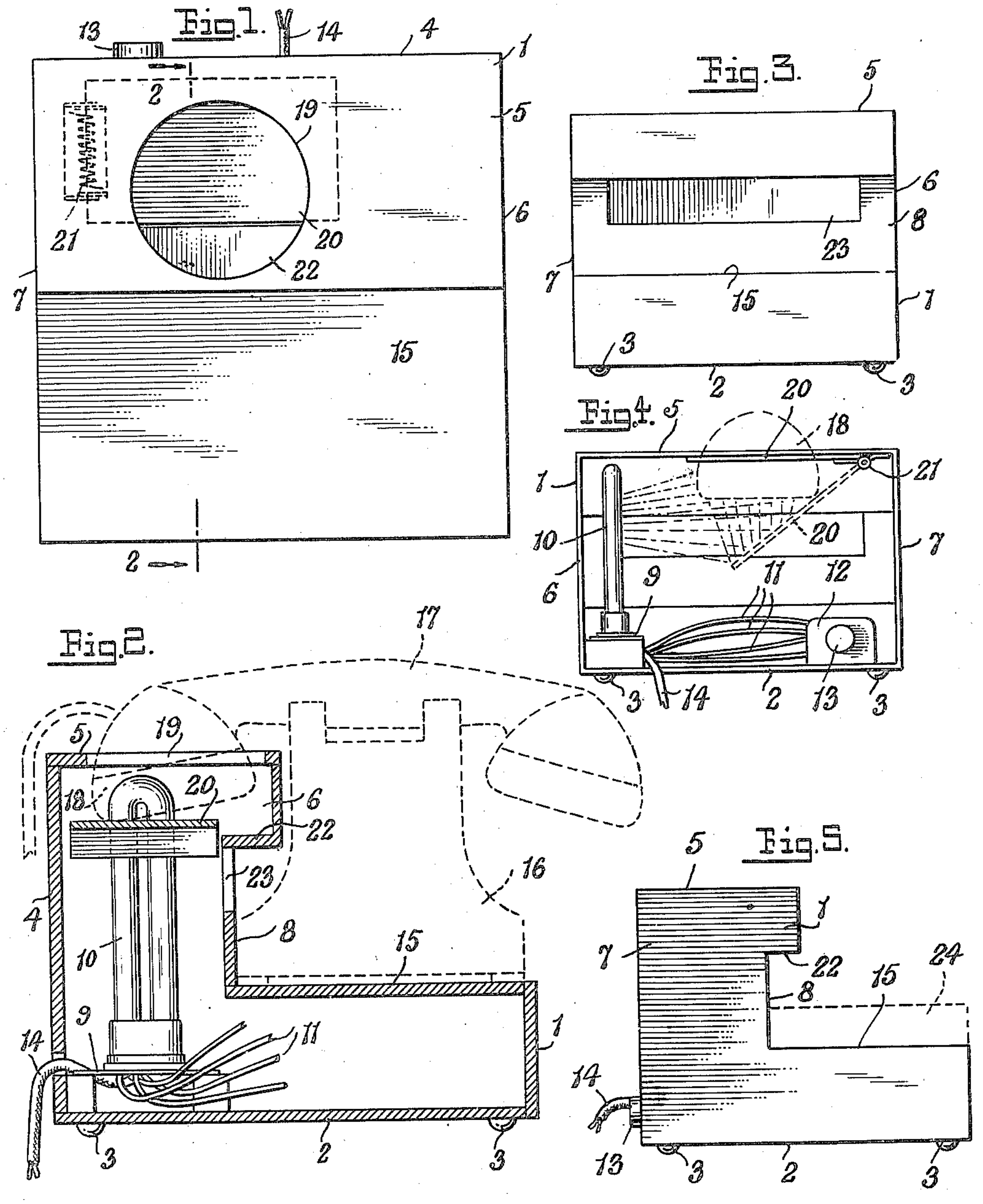

This invention relates to sterilizing devices for telephones and particularly to means by which the mouthpiece of the telephone will be subjected to the influence of ultra-violet rays to thereby sterilize this portion of the receiver.

An object of the invention is to provide a device of this character which can be readily used in connection with the telephone without requiring the telephone to be affixed or mechanically or electrically coupled in any way to the sterilizing device, and which will subject the mouthpiece of the telephone to the ultra-violet rays after each use of the telephone.

More particularly, the invention contemplates the provision of a suitable housing containing an ultra-violet ray lamp and the electrical instrumentalities for illuminating the lamp from the conventional electrical outlet in the home or office; the housing having a support on which the base of the telephone is rested in such a manner that the mouthpiece end of the receiver is disposed through an opening in the housing to thereby locate said mouthpiece in a position to receive the ultra-violet rays from the lamp. Closure means is provided for the opening enabling the opening to be normally held closed while the receiver is out of the opening or is in use, said closure being moved to its open position by the pressure of the mouthpiece of the receiver when the receiver is restored to its resting position on the telephone base.

The invention contemplates the provision of the above features and the attainment of the objects set forth and other objects hereinafter mentioned, as will be pointed out in the following specification and claims appended hereto.

In the accompanying drawings, wherein an illustrative embodiment of the invention is disclosed, Fig. 1 is a top plan view of the improved sterilizing device as constructed in accordance with the invention; Fig. 2 is a sectional view taken on the line 2—2 of Fig. 1, looking in the direction of the arrows; Fig. 3 is a front elevation, on a reduced scale, of the device; Fig. 4 is a view, also on a reduced scale, looking at the rear of the device, with the rear wall removed to disclose the elements contained within the housing; and Fig. 5 is a side elevation of the device.

Referring to the embodiment of the invention as disclosed in the drawings, 1 indicates the body of the housing or casing in which the sterilizer means is contained. Said housing may be made of wood, plastic, metal or other suitable material, and includes a bottom or base member 2 provided with suitable supporting feet 3; a back panel 4, a top panel 5, end walls 6 and 7, and a front wall 8. The parts of the housing may be suitably united and one or more of these housing or casing elements may be separable to enable access to the interior of the housing to be had whenever desired for replacement of the electrical elements contained within the same.

Suitably supported above the bottom member 2 of the housing is a lamp socket 9 in which the ultra-violet lamp or tube 10 is received. Wiring 11 connects the socket in the known manner to the ballast 12 and starter 13, and the electric cord 14 is connected into the electric circuit in the known manner so that when the cord is plugged into the lighting circuit the ultra-violet lamp 10 will be illuminated. A switch may be incorporated into the circuit, if desired, so that the lamp may be turned off when the device is not being used for any protracted period.

At 15 is shown a shelf or supporting surface provided on the housing for the support of the base of the telephone, indicated in Fig. 2 at 16, in dotted lines. The receiver of the telephone, and indicated at 17, is supported by the base 16 in the conventional manner and when so supported it has its mouthpiece 18 projecting through an opening or aperture 19 in the top wall 5 of the housing. The result is that the mouthpiece end 18, of the receiver, 17, is disposed within the housing 1 and in position to receive the sterilizing influence of the ultra-violet rays from the lamp or tube 10.

Provided within the housing, and directly below the opening or aperture 19 is a closure member or trap door 20 in the form of a plate which is pivotally mounted at one end by a spring hinge 21, the spring thereof normally tending to raise the closure member to cause it to cooperate with the ledge 22 and close the opening 20 and prevent the rays from the lamp from striking the eyes of the telephone user, when the receiver is not located in the opening 19 and is being used.

When the receiver is placed back on the base 16 at the conclusion of a telephone call, the mouthpiece end 18 of the receiver will protrude through the opening 19 into the housing 1, and its pressure will cause the closure member 20 to be swung downwardly against the torsion of the spring in the hinge 21 and be held down so that the rays from the lamp 10 will reach the mouthpiece of the receiver and subject the same to their sterilizing influence. The upper face of the closure member 20 may be coated with reflector material to direct the rays against the mouthpiece as indicated in Fig. 4.

As long as the receiver is in its position of non-use, or is "on the hook," its mouthpiece will be located in the housing and will be subjected to the sterilizing ultra-violet rays. When the user picks up the receiver, the weight of the receiver being removed from the closure member 20, will permit said closure member to be automatically closed by the influence of the spring hinge 21 so that the rays will be shut off from the view of the telephone user.

The arrangement above described is such that the device is applied to the telephone by merely placing the telephone in position on the shelf or surface 15, such act tending to at once so position the receiver of the telephone that its mouthpiece will enter the opening 19 and will depress the closure member 20 and permit the mouthpiece to be located in position and exposed to receive the ultra-violet rays from the lamp 10.

In the embodiment of the invention disclosed, the housing is so shaped to enable a telephone instrument of the best known type to be received by it and the receiver thereof to fit into the aperture 10. It will be apparent that various changes in shape, size and arrangement of the parts of the housing may be made to suit different types of telephones in use and such changes are contemplated as within the scope of the present invention. For example, an opening 23 is shown in the front wall 8 of the housing, such wall permitting the inward protrusion of part of the base of certain types of telephone receivers, and also allowing for ventilation of the interior of the housing, without permitting the rays to reach the eyes of the telephone user. The supporting surface 15 may, if required by certain types of telephones, be elevated by securing a plate or elevating member upon it, as indicated at 24 in Fig. 5.

Having described one embodiment of the invention, it is obvious that the same is not to be restricted thereto but is broad enough to cover all structures coming within the scope of the annexed claims.

What I claim is:

1. A sterilizing device for telephones comprising, a housing containing an ultra-violet ray lamp and electrical wiring for connection to a source of current to cause illumination of the lamp, the housing having a shelf portion upon which the base of a telephone is rested, the top of the housing being provided with an opening through which the mouthpiece end of the receiver of the telephone extends while the receiver is supported by the base to thereby locate said end of the receiver within the housing and in position to receive ulra-violet rays from the lamp, a spring-pressed closure member hingedly mounted within the housing below the opening therein and adapted to be maintained in an open position against the pressure of its spring by the pressure of the mouthpiece end of the receiver inserted through the opening and resting against said closure member, the spring means being operative on the closure member to hold the same in closed position over the opening when the mouthpiece of the receiver is out of said opening.

2. A sterilizing device for telephones comprising, a housing having a support on which a telephone base with a receiver thereon is rested, the top of the housing being provided with an opening in which the mouthpiece end of the telephone extends while the base of the telephone is resting on the support and while the receiver of the telephone is supported on said base, a source of ultra-violet rays within the housing and adapted to direct the rays against the mouthpiece portion of the receiver while that portion of the receiver is located within the housing, a closure member in the form of a hinged plate normally held in closed position over the opening in the housing by spring means within said housing, said closure member being held in open position by the mouthpiece portion of the telephone receiver by pressure of the receiver against the closure member in opposition to said spring means when said mouthpiece portion is inserted through the opening in the housing.

JOHN SULLIVAN.

REFERENCES CITED

The following references are of record in the file of this patent:

UNITED STATES PATENTS

| Number | Name | Date |
|---|---|---|
| 2,165,545 | Heller | July 11, 1939 |
| 2,286,900 | Danley et al. | June 16, 1942 |
| 2,316,540 | Danley et al. | Apr. 13, 1943 |

FOREIGN PATENTS

| Number | Country | Date |
|---|---|---|
| 402,263 | Great Britain | Nov. 30, 1933 |
| 450,465 | Great Britain | July 17, 1936 |
| 517,412 | Great Britain | Jan. 29, 1940 |